United States Patent
Dhanasarnsombat et al.

(10) Patent No.: US 9,536,568 B2
(45) Date of Patent: Jan. 3, 2017

(54) DISPLAY SYSTEM WITH MEDIA PROCESSING MECHANISM AND METHOD OF OPERATION THEREOF

(71) Applicant: Samsung Electronics Co., Ltd., Gyeonggi-Do (KR)

(72) Inventors: Dhana Dhanasarnsombat, San Jose, CA (US); Daniela Karin Busse, San Francisco, CA (US); Tom Brinck, Palo Alto, CA (US); Suranjit Adhikari, San Jose, CA (US); Parker Ralph Kuncl, Los Gatos, CA (US)

(73) Assignee: Samsung Electronics Co., Ltd., Gyeonggi-Do (SK)

( * ) Notice: Subject to any disclaimer, the term of this patent is extended or adjusted under 35 U.S.C. 154(b) by 445 days.

(21) Appl. No.: 13/834,835

(22) Filed: Mar. 15, 2013

(65) Prior Publication Data
US 2014/0270700 A1    Sep. 18, 2014

(51) Int. Cl.
*G11B 27/28*    (2006.01)
*G11B 27/10*    (2006.01)

(52) U.S. Cl.
CPC ........... *G11B 27/102* (2013.01); *G11B 27/105* (2013.01); *G11B 27/28* (2013.01)

(58) Field of Classification Search
None
See application file for complete search history.

(56) References Cited

U.S. PATENT DOCUMENTS

| | | | |
|---|---|---|---|
| 7,199,841 | B2 | 4/2007 | Suh |
| 8,243,203 | B2 | 8/2012 | Suh |
| 2003/0014758 | A1 | 1/2003 | Kim |
| 2003/0093790 | A1* | 5/2003 | Logan ............... G06F 17/30265 725/38 |
| 2005/0153785 | A1 | 7/2005 | Sun |
| 2005/0210518 | A1 | 9/2005 | Jeong |
| 2006/0059120 | A1 | 3/2006 | Xiong et al. |
| 2007/0041706 | A1* | 2/2007 | Gunatilake ............ G11B 27/10 386/241 |
| 2009/0132924 | A1 | 5/2009 | Vasa et al. |
| 2010/0132005 | A1 | 5/2010 | Chien et al. |
| 2011/0052154 | A1* | 3/2011 | Weber .................. G11B 27/034 386/280 |
| 2011/0224899 | A1 | 9/2011 | Mathews |
| 2011/0238406 | A1 | 9/2011 | Chen et al. |
| 2012/0204214 | A1 | 8/2012 | Brenner et al. |
| 2013/0064525 | A1* | 3/2013 | Cary .................... G11B 27/031 386/285 |

FOREIGN PATENT DOCUMENTS

| | | |
|---|---|---|
| EP | 1811773 A2 | 5/2007 |
| EP | 1804510 A1 | 7/2007 |
| EP | 1919216 A1 | 5/2008 |
| JP | 2007116689 A | 1/2003 |
| WO | 2013036048 A2 | 3/2013 |

* cited by examiner

*Primary Examiner* — Eileen Adams
(74) *Attorney, Agent, or Firm* — IP Investment Law Group

(57) ABSTRACT

A method of operation of a display system includes: receiving a recap request for a source media; generating source content descriptors for the source media with a control unit; extracting a source recap segment from the source media based on correlation of the source content descriptors with a recap theme associated with the recap request; and generating a custom recap with the source recap segment for displaying on a device.

22 Claims, 9 Drawing Sheets

DISPLAY SYSTEM WITH MEDIA PROCESSING MECHANISM AND METHOD OF OPERATION THEREOF

TECHNICAL FIELD

An embodiment of the present invention relates generally to a display system, and more particularly to a system for media processing.

BACKGROUND

Modern consumer and industrial electronics, especially devices such as graphical display systems, televisions, projectors, cellular phones, portable digital assistants, and combination devices, are providing increasing levels of functionality to support modern life including media processing. Research and development in the existing technologies can take a myriad of different directions.

The increasing demand for information in modern life requires users to access information at any time, while a variety of consumer devices allow for increased functionalities. However, increasing demand for information and media access "on demand" has been limited even though the consumer devices allow for increased functionalities.

Thus, a need still remains for display system with media processing to display "on demand" media. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a display system including: receiving a recap request for a source media; generating source media descriptors for the source media with a control unit; extracting a source recap segment from the source media based on correlation of the source media descriptors with a recap theme associated with the recap request; and generating a custom recap with the source recap segment for displaying on a device.

An embodiment of the present invention provides a method of operation of a display system including: receiving a source media from a source media provider; generating source media descriptors for the source media with a control unit; extracting a source recap segment from the source media based on correlation of the source media descriptors with a recap theme associated with the recap request; and generating a custom recap with the source recap segment for displaying on a device.

An embodiment of the present invention provides a display system, including: a request process module for receiving configured to receive a recap request for a source media; a control unit, coupled to the request process module, for generating configured to generate source content descriptors for the source media; a media aggregator module, coupled to the request process module, for extracting configured to extract a source recap segment from the source media based on correlation of the source content descriptors with a recap theme associated with the recap request; and a recap selection module, coupled to the media aggregator module, for generating configured to generate a custom recap with the source recap segment for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
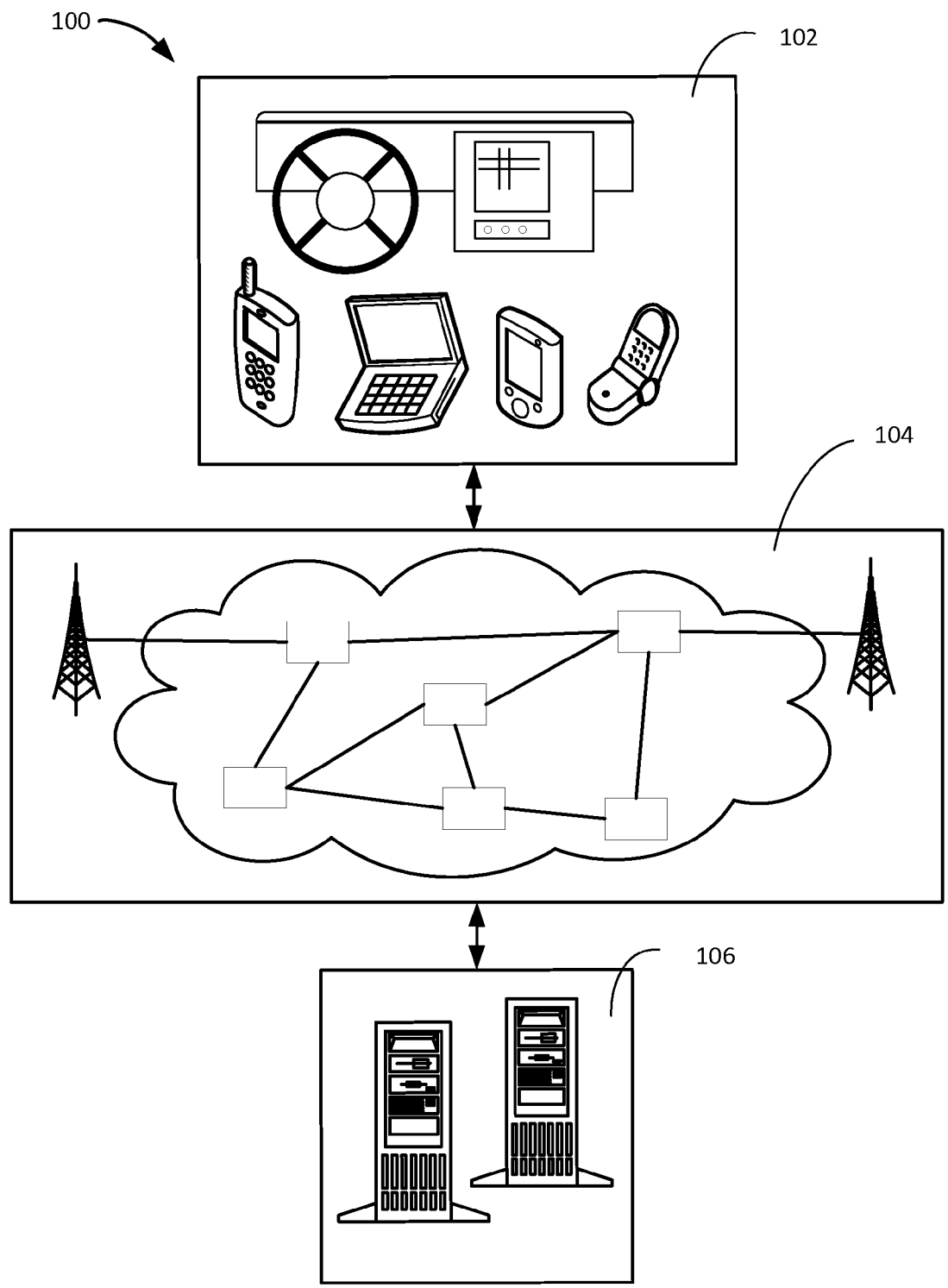
FIG. 1 is a display system with media processing mechanism in an embodiment of the present invention.

A display system enables a user to request a custom recap, such as a synopsis or a highlight reel, at any point while watching source media, such as television programs or videos, with a recap request. The custom recap can be context specific to events or progress of live media, recorded media, or a combination thereof. The source media can be collected, packaged, and edited based on a user viewing history, a user viewing preference, reaction information, or a combination thereof. The display system can apply recap enhancements, such as visual or sound effects, to the custom recap to create continuity between the segments within the custom recap, the transition between presentation of the source media and the custom recap, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a display system 100 with media processing mechanism in an embodiment of the present invention. The display system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

For illustrative purposes, the display system 100 is described with the first device 102 as a display device, although it is understood that the first device 102 can be different types of devices. For example, the first device 102 can also be a device for presenting images or a multimedia presentation. A multimedia presentation can be a presentation including sound, a sequence of streaming images, a video feed, or a combination thereof. As an example, the first device 102 can be a high definition television, a three dimensional television, a computer monitor, a personal digital assistant, a cellular phone, or a multimedia set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the display system 100 is described with the second device 106 as a computing device, although it is understood that the second device 106 can be different types of devices. Also for illustrative purposes, the display system 100 is shown with the second device 106 and the first device 102 as end points of the communication path 104, although it is understood that the display system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
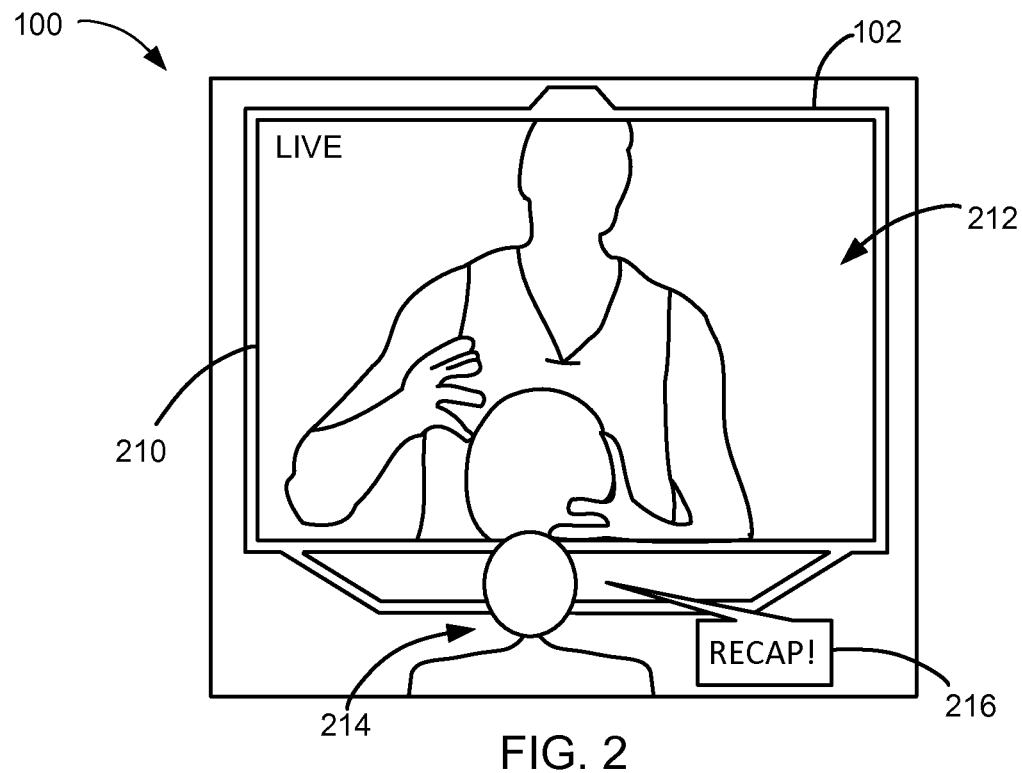
FIG. 2 is an example of a display interface of the first device of FIG. 1.

Referring now to FIG. 2, therein is shown an example of a display interface 210 of the first device 102 of FIG. 1. The display interface 210 is shown presenting a source media 212. The source media 212 is unmodified multimedia content presented from a content provider. The source media 212 can be live content, which is content or programming that is broadcasted or streamed in real-time as events are occurring in the present time, and previously unavailable to a user 214. For example, the live content can be live news broadcasts, live sporting events, game shows, concerts, award shows, or a premier or first time broadcast of content or programming. As an example, the source media 212 is a basketball game.

The source media 212 can be recorded content, which is content or programming that is time delayed or recorded and perhaps been previously available for viewing to the user. For example, the recorded content can be content that has been previously broadcast, such as a re-run television programs, on-demand content or programming, online streamed content from provides such as Netflix™ or Hulu™, time delayed content, including content from recording devices such as a DVD player, TiVo™, or Digital Video Recorder (DVR), or other recorded programs.

For illustrative purposes, the display interface 210 is shown presenting the source media 212 as the live content, such as a live sporting event, although it is understood that the source media 212 can be a different form of content. For example, the source media 212 can be the recorded content, such as a rebroadcasted or time delayed presentation of the sporting event.

FIG. 2 depicts the user 214 viewing the source media 212 presented on the display interface 210. The user 214 can make a recap request 216 which is received by the first device 102 of the display system 100. The recap request 216 is a request to generate a recap or summary of the media content that temporally precedes the portion of the media content currently being presented. The recap request 216 can be a request by the user 214 to generate a summary or recap covering the portions of the source media 212 that temporally precedes the portion of the source media 212 currently being presented on the first device 102. For example, the user 214 can make the recap request 216 half way through the presentation of the source media 212 to generate a recap covering the first half of the source media 212.

The recap request 216 can include a request to cover or summarize specific aspects of the source media 212. For example, the user 214 can make the recap request 216 to feature a specific event, team, athlete, or certain type of information, such as miss/made attempt chart or graphic when the source media 212 is a basketball game.

For illustrative purposes, FIG. 2 depicts the user 214 making the recap request 216 by a spoken command, although it is understood that the user 214 can make the recap request 216 in other ways. For example, the user 214 can make the recap request 216 through physical gestures, such as a waving motion or other motions that are recognized by the first device 102 as the recap request 216. As another example, the user 214 can make the recap request 216 through an input device (not shown), such as a remote control or a remote device linked to the first device 102.

Figure 3:
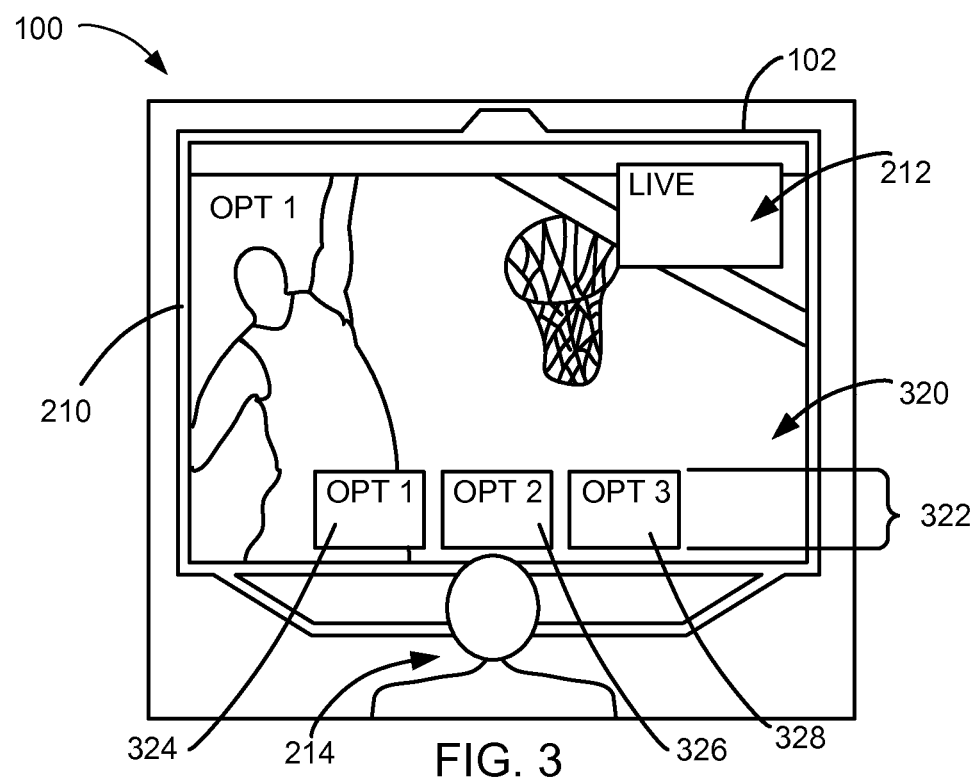
FIG. 3 is a further example of the display interface of the first device of FIG. 1.

Referring now to FIG. 3, therein is shown a further example of the display interface 210 of the first device 102. The first device 102 depicts the display interface 210 is shown presenting a custom recap 320 for the source media 212. As an example, the source media 212 is a basketball game.

The custom recap 320 is a recap or summary of the media content that temporally precedes the portion of the media content currently being presented. The custom recap 320 can be a recap or summary covering the content of source media 212 that temporally precedes the portion of the source media 212 currently being presented on the first device 102. For example, the custom recap 320 can be a recap or summary covering the first half of the source media when the user 214 makes the recap request 216 of FIG. 2 half way through the presentation of the source media 212.

The custom recap 320 can be customized to the user 214. For example, recap request 216 can be generated based on the preferences or viewing history of the user 214. As a specific example, the custom recap 320 can include portions of the source media 212 that focus on or feature a favorite actor, character, athlete, or team of the user 214. In another specific example, the custom recap 320 can include content related to the source media 212 such as previous events, episode, or game that the user 214 has not yet viewed.

The custom recap 320 can be generated from the portions of source media 212 that temporally precedes the portion of the source media 212 currently being presented on the first device 102 and from additional sources other than the source media 212, such as online sources including websites and databases. For example, the custom recap 320 can include text or audio summarizing scenes between clips of portions of the source media 212. As a further example, the source media 212 can include statistical information, such as team scores or player statistics for a sporting event taken from online databases or websites.

The custom recap 320 and the source media 212 can be presented on the first device 102 in a number of different ways. For illustrate purposes, the display interface 210 is shown with the custom recap 320 having the source media 212 presented in the corner of the display interface 210, although it is understood that the custom recap 320 can be present the custom recap 320 differently. For example, the custom recap 320 can be presented on the display interface 210 without the source media 212 displayed or can have the source media 212 displayed in a different location of the display interface 210.

The display system 100 can present one or more custom recap options 324. The custom recap options 324 are recaps or summaries covering or focusing on different aspects or portions of the media content. The custom recap options 324 can include multiple instances of the custom recap 320 covering or focusing on different aspects of the source media 212. For example, a first recap option 324 of the custom recap options 324 can include portions of the source media 212 featuring a specific character, actor, or athlete. To continue the example, a second recap option 326 of the custom recap options 324 can summarize the progress of a team or the general progress of a sporting event through video clips or highlights. To further the example, a third recap option 328 of the custom recap options 324 can present a summary of statistical information or strategies used by a team or athlete.

For illustrative purposes, the display system 100 includes the custom recap options 324 including the first recap option 324, the second recap option 326, and the third recap option 328, although it is understood that the display system 100 can include a different number of the custom recap options 324. For example, the custom recap options 324 can include a fourth recap option or may not include the third recap option 328.

Figure 4:
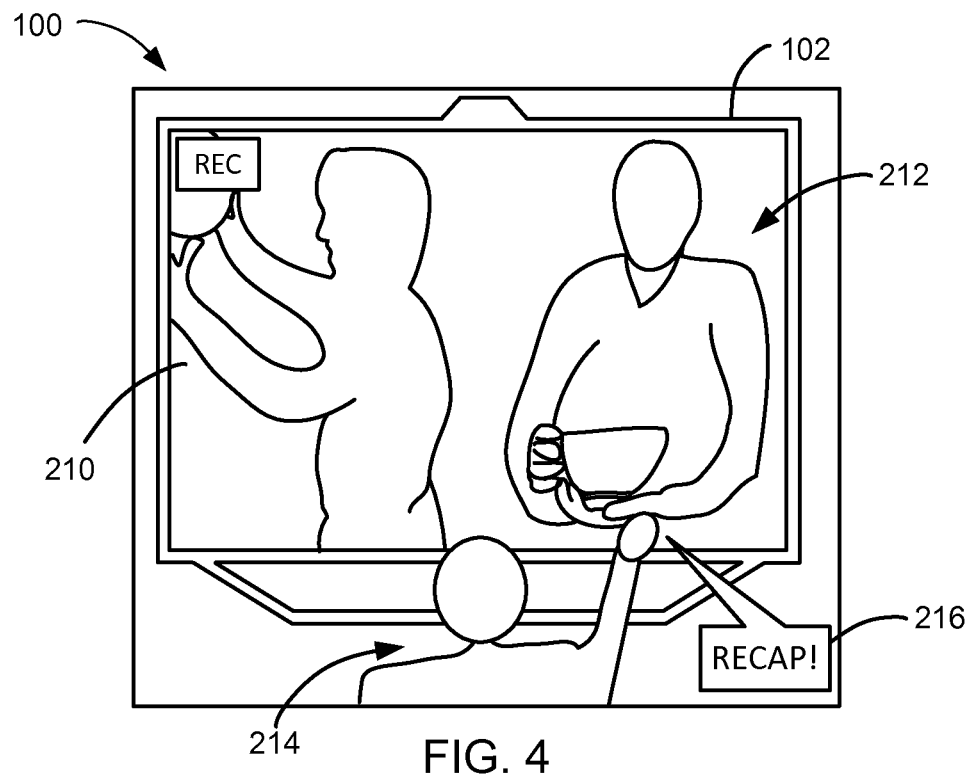
FIG. 4 is a further example of the display interface of the first device of FIG. 1.

Referring now to FIG. 4, therein is shown a further example of the display interface 210 of the first device 102 of FIG. 1. The display interface 210 is shown presenting the source media 212. As an example, the source media 212 is a television drama.

For illustrative purposes, the display interface 210 is shown presenting the source media 212 as the recorded, such as recorded television drama, although it is understood that the source media 212 can be a different form of content. For example, the source media 212 can be the live content, such as a rebroadcast or time delayed presentation of the television program.

FIG. 4 depicts the user 214 viewing the source media 212 presented on the display interface 210. The user 214 can make the recap request 216 which is received by the first device 102 of the display system 100.

For illustrative purposes, FIG. 4 depicts the user 214 making the recap request 216 through physical gestures, such as a waving motion or other motions that are recognized by the first device 102 as a recap request 216 although it is understood that the user 214 can make the recap request 216 in other ways. For example, the user 214 can make the recap request 216 through spoken command. As another example, the user 214 can make the recap request 216 through an input device (not shown), such as a remote control or a remote device linked to the first device 102.

Figure 5:
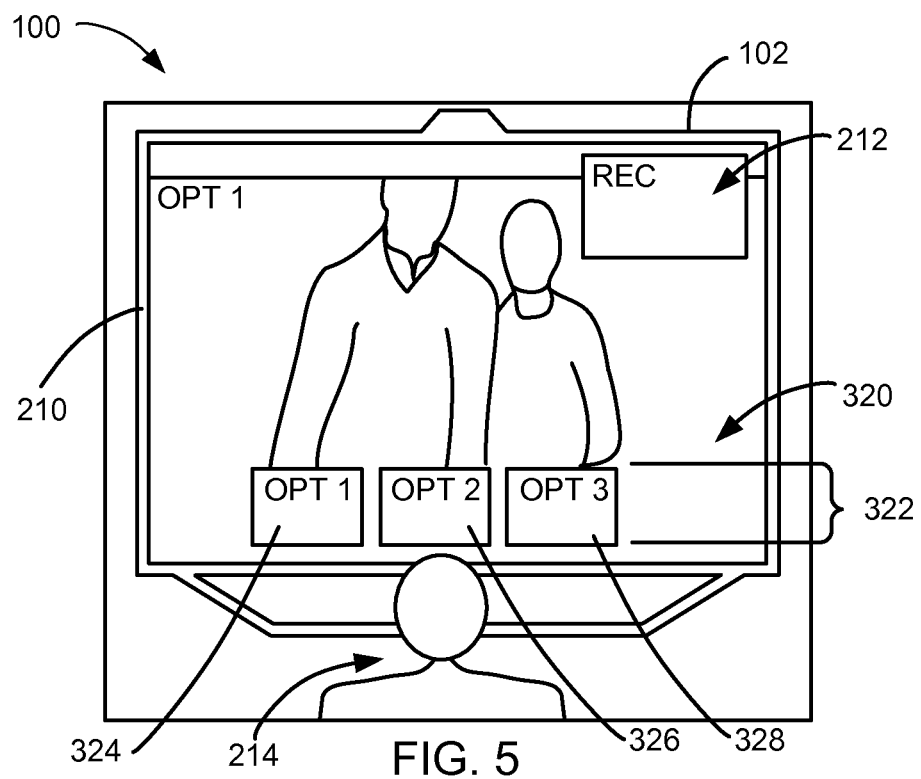
FIG. 5 is a further example of the display interface of the first device of FIG. 1.

Referring now to FIG. 5, therein is shown a further example of a display interface 210 of the first device 102 of FIG. 1. The first device depicts the display interface 210 is shown presenting the custom recap 320 for the source media 212. As an example, the source media 212 is a television drama.

The custom recap 320 and the source media 212 can be presented on the first device 102 in a number of different ways. As an example, the display interface 210 is shown with the custom recap 320 having the source media 212 presented in the corner of the display interface 210 in a "picture-in-picture" format.

The display system 100 can present one or more of the custom recap options 324. For example, a first recap option 324 of the custom recap options 324 can include portions of the source media 212 featuring a specific character, actor, or athlete. To continue the example, a second recap option 326 of the custom recap options 324 can present major plot developments through video clips or highlights. To further the example, a third recap option 328 of the custom recap options 324 can present a chart or outline of the story line that can include text, images, or a combination thereof.

For illustrative purposes, the display system 100 includes the custom recap options 324 including the first recap option 324, the second recap option 326, and the third recap option 328, although it is understood that the display system 100 can include a different number of the custom recap options 324. For example, the custom recap options 324 can include a fourth recap option presenting additional information or may not include the third recap option 328.

Figure 6:
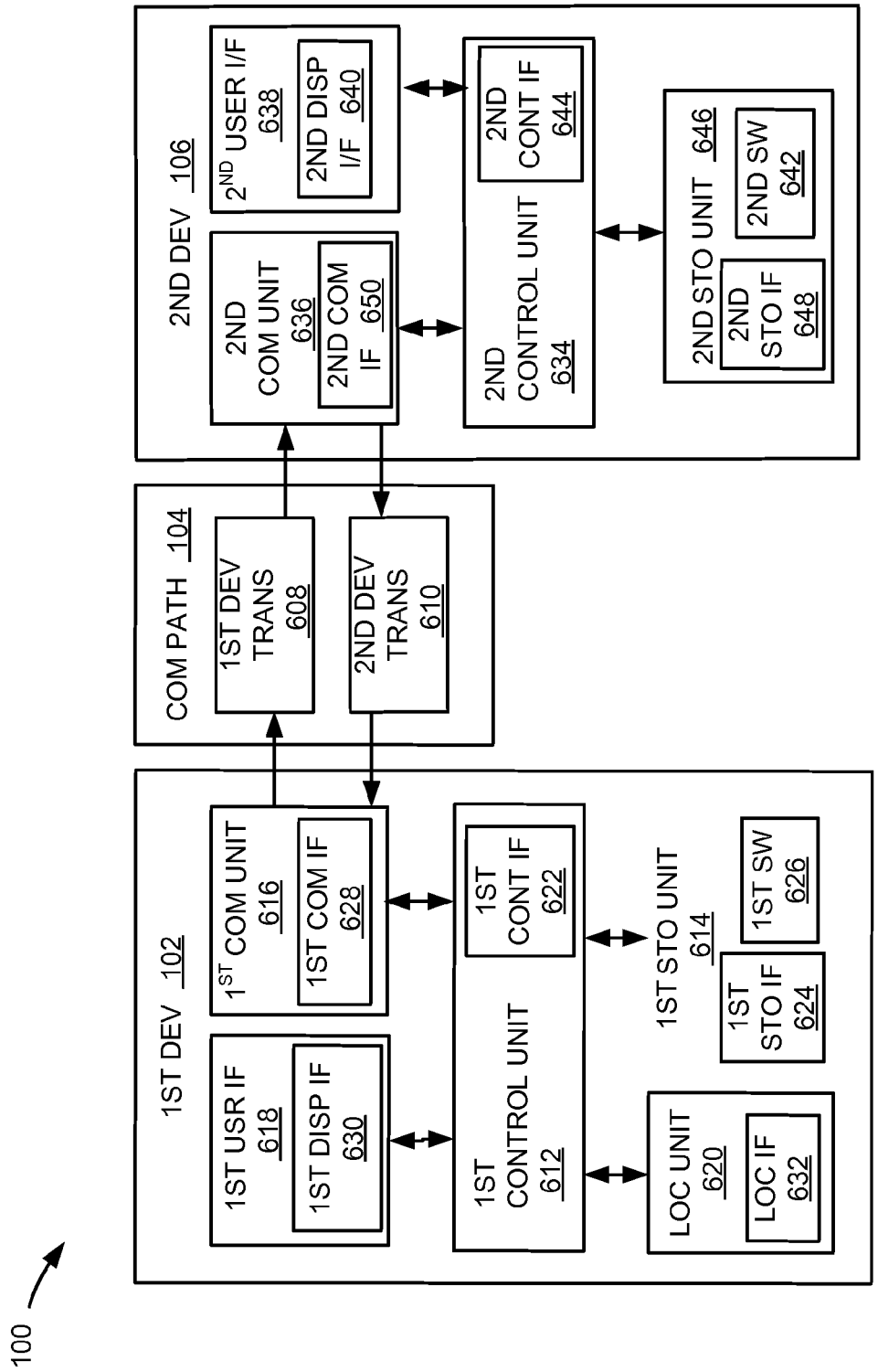
FIG. 6 is an exemplary block diagram of the display system.

Referring now to FIG. 6, therein is shown an exemplary block diagram of the display system 100. The display system 100 can include the first device 102, the communication path 104, and the second device 106. The first device 102 can send information in a first device transmission 608 over the communication path 104 to the second device 106. The second device 106 can send information in a second device transmission 610 over the communication path 104 to the first device 102.

For illustrative purposes, the display system 100 is shown with the first device 102 as a client device, although it is understood that the display system 100 can have the first device 102 as a different type of device. For example, the first device 102 can be a server having a display interface.

Also for illustrative purposes, the display system 100 is shown with the second device 106 as a server, although it is understood that the display system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 612, a first storage unit 614, a first communication unit 616, and a first user interface 618. The first control unit 612 can include a first control interface 622. The first control unit 612 can execute a first software 626 to provide the intelligence of the display system 100.

The first control unit 612 can be implemented in a number of different manners. For example, the first control unit 612 can be a processor, an application specific integrated circuit (ASIC) an embedded processor, a microprocessor, a hardware control logic, a hardware finite state machine (FSM), a digital signal processor (DSP), or a combination thereof. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations external to the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The first storage unit 614 can store the first software 626. The first storage unit 614 can also store the relevant information, such as data representing incoming images, data representing previously presented image, sound files, or a combination thereof.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 624. The first storage interface 624 can be used for communication between and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations external to the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106 of FIG. 1, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, an infrared sensor for receiving remote signals, or any combination thereof to provide data and communication inputs.

The first user interface 618 can include a first display interface 630. The first display interface 630 can include a display, a projector, a video screen, a speaker, or any combination thereof.

The first control unit 612 can operate the first user interface 618 to display information generated by the display system 100. The first control unit 612 can also execute the first software 626 for the other functions of the display system 100. The first control unit 612 can further execute the first software 626 for interaction with the communication path 104 via the first communication unit 616.

The second device 106 can be optimized for implementing an embodiment of the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the display system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the display system 100, including operating the second communication unit 636 to communicate with the first device 102 over the communication path 104.

The second control unit 634 can be implemented in a number of different manners. For example, the second control unit 634 can be a processor, an embedded processor, a microprocessor, hardware control logic, a hardware finite state machine (FSM), a digital signal processor (DSP), or a combination thereof.

The second control unit 634 can include a second controller interface 644. The second controller interface 644 can be used for communication between the second control unit 634 and other functional units in the second device 106. The second controller interface 644 can also be used for communication that is external to the second device 106.

The second controller interface 644 can receive information from the other functional units or from external sources, or can transmit information to the other functional units or to external destinations. The external sources and the external destinations refer to sources and destinations external to the second device 106.

The second controller interface 644 can be implemented in different ways and can include different implementations depending on which functional units or external units are being interfaced with the second controller interface 644. For example, the second controller interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the such as data representing incoming images, data representing previously presented image, sound files, or a combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the display system 100 is shown with the second storage unit 646 as a single hierarchy storage system, although it is understood that the display system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations external to the second device 106.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The display system 100 can be executed by the first control unit 612, the second control unit 634, or a combination thereof. For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the display system 100 is described by operation of the first device 102 and the second device 106. It is understood that the first device 102 and the second device 106 can operate any of the modules and functions of the display system 100.

Figure 7:
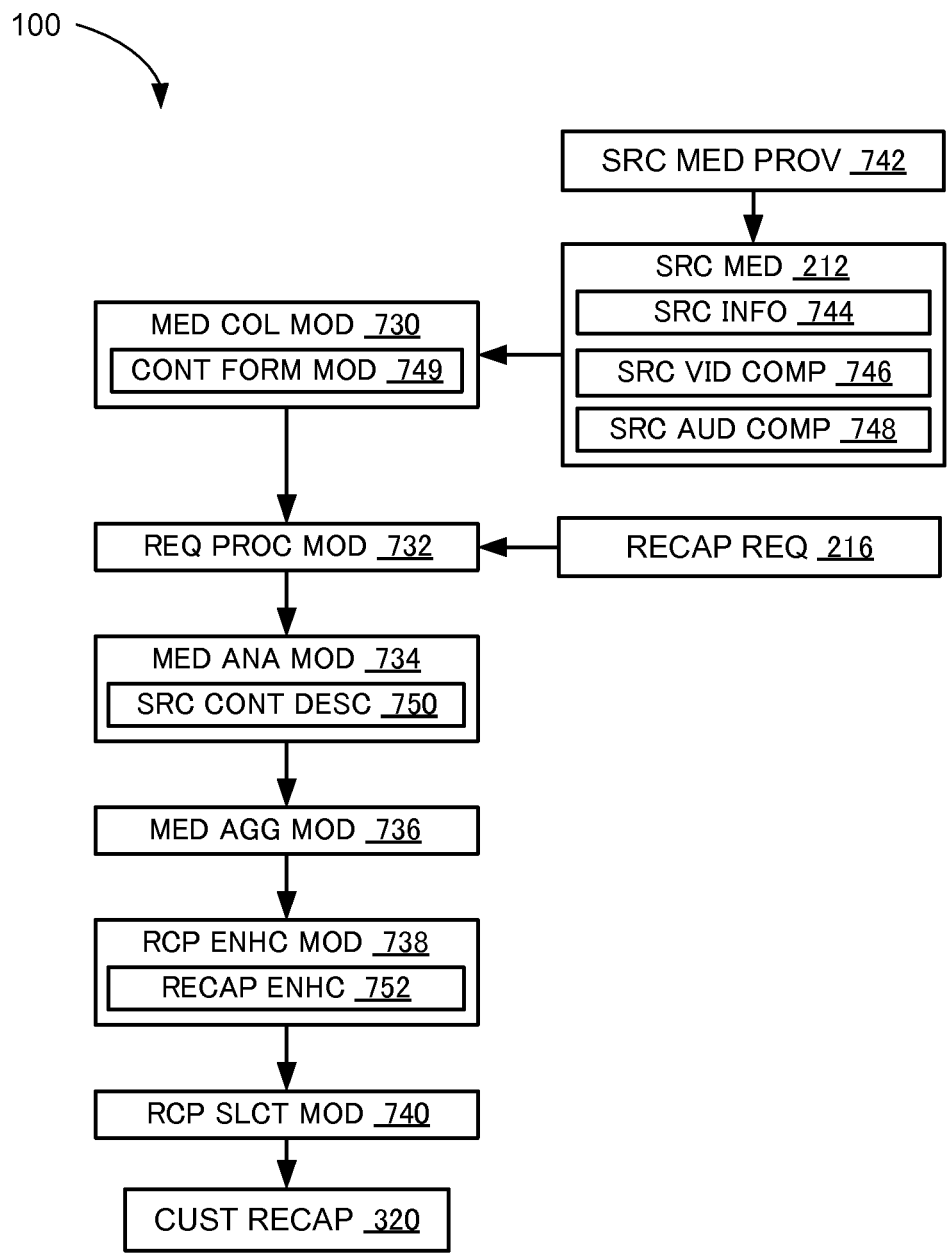
FIG. 7 is a control flow of the display system.

Referring now to FIG. 7, therein is shown a control flow of the display system 100. The display system 100 can generate the custom recap 320 with a media collect module 730, a request process module 732, a media analysis module 734, a media aggregator module 736, a recap enhancement module 738, and a recap selection module 740.

The display system 100 can include the media collect module 730. The media collect module 730 is configured to collect and format media for down-stream processing or modification. The media collect module 730 can receive the source media 212 from a source media provider 742. The source media provider 742 is the source that provides the media content. For example, the source media provider 742 can be a broadcast station, media player, such as a DVD player or a local hard drive, TiVo™, an online source, such as Hulu™ or Amazon Prime™, a cable or satellite television provider, or any combination thereof. The media collect module 730 can receive the source media 212 that is streamed, broadcasted, or recalled from the source media provider 742.

The source media 212 can include source information 744, a source video component 746, and a source audio component 748. The source information 744 is information provided by the media provider about and related to the media. The source information 744 can include information available from the source media provider 742 about or related to the source media 212. For example the source information 744 can include caption or subtitles; program and system information transmitted through Program and System Information Protocol (PSIP), such as air time, rating, and program guide information; or any combination thereof. The source information 744 can be embedded within the source media 212 or transmitted along with the source media 212.

The media collect module 730 can include a content format module 749. The content format module 749 is configured to format the media received from the media provider. The content format module 749 can extract the source information 744 from the source media 212 when the source information 744 is embedded with the source media 212. For example, the content format module 749 can decode the source media 212 to extract the source information 744 and convert the source information 744 into a structured file format, such as Extensible Markup Language (XML) or JavaScript Object Notation (JSON).

The media collect module 730 can store the source media 212 and the source information 744 that has been formatted for subsequent processing. For example, the media collect module 730 can store the source media 212 and the source information 744 in the first storage unit 614 of FIG. 6, the second storage unit 646 of FIG. 6, partitioned between the first storage unit 614 and the second storage unit 646, or any combination thereof. For example, the source media 212 can be stored on the second storage unit 646 and the source information 744 can be stored in the first storage unit 614. The source media 212 and the source information 744 can be stored until needed to generate the custom recap 320.

The display system 100 can include the request process module 732, coupled to the media collect module 730. The request process module 732 is configured to receive a request to generate a recap of media contemporaneously being presented. The request process module 732 can receive the recap request 216. For example, the request process module 732 can receive the recap request 216 through the first user interface 318 of FIG. 6, which can include a remote control device, an n-screen device, motion or gesture recognition device, voice recognition device, or any combination thereof.

The request process module 732 can initiate generation of the custom recap 320. For example, once the request process module 732 receives the recap request 216, the request process module 732 can retrieve the source media 212, the source information 744, or a combination thereof for processing by the media analysis module 734.

The display system 100 can include the media analysis module 734 coupled to the request process module 732. The media analysis module 734 is configured to analyze the content of the media and generate a description of the content of the media. The media analysis module 734 can analyze various components of the source media 212, such as the source video component 746, the source audio component, or the source information 744 to generate source content descriptors 750 for the source media 212. These functions will be described in detail below.

The source content descriptors 750 are details describing the contents of the media. For example, the source content descriptors 750 can describe specific aspects of the source media 212, such as scene type, show type, presentation format, the occurrences of important events, or any combination thereof.

The display system 100 can include the media aggregator module 736 coupled to the media analysis module 734. The media aggregator module 736 is configured to determine a theme or focus for the requested recap; extract portions of the media that are relevant to the theme or focus based on the media descriptors; generate supplemental material for the recap, and generate the recap with the relevant source portions and supplemental material. The media aggregator module 736 can generate the custom recap 320 with the source media 212, the source information 744, and the source content descriptors 750. As an example, the media aggregator module 736 can splice, edit, and package the source media 212 based on viewing history or viewing preference of the user 214. These functions will be described in detail below.

The media aggregator module 736 can generate the custom recap options 324 of FIG. 3, including the first recap option 324, the second recap option 326, and the third recap option 328, all of FIG. 3. For example, the media aggregator module 736 can generate the custom recap options 324 when the source media 212 includes sufficient content or additional supplemental content is available to generate the custom recap options 322.

The display system 100 can include the recap enhancement module 738 coupled to the media aggregator module 736. The recap enhancement module 738 is configured to add effects to enhance the recap. The recap enhancement module 738 can apply recap enhancements 752 to the custom recap 320.

The recap enhancements 752 are supplemental or additional effects for enhancing the recap content. For example, the recap enhancements 752 can be transitions, filters, text, animations, visual effects, or any combination thereof. As an example, the recap enhancements 752 can be custom generated by the recap enhancement module 738. In another example, the recap enhancements 752 can be generic, stock or "off the shelf" effects, such as generic clip art, music, sound effects, animations or any combination thereof that are available for use by the.

The recap enhancement module 738 can apply the recap enhancements 752 to the custom recap 320 to enhance and create continuity between the portions or segments of the custom recap 320. For example, the recap enhancement module 738 can apply one of the recap enhancements 752 that includes or adds text to a sports video clip that includes the score or the action taken by a player. As a further example, the recap enhancement module 738 can apply one of the recap enhancements 752 that includes or adds a visual effect when transitioning between one portion of the custom recap 320 and an immediately subsequent portion of the custom recap 320, such as a fade-in, fade-out, or a page turning effect. In yet a further example, the recap enhancement module 738 can apply one of the recap enhancements 752 that includes or adds background music or sound effects to the custom recap 320.

The display system 100 can include the recap selection module 740 coupled to the recap enhancement module 738.

The recap selection module 740 is configured to present the recap content for selection by the viewer of the content. The recap selection module 740 can receive the custom recap 320 that has been enhanced with the recap enhancements 752 from the recap enhancement module 738 for displaying on a device, such as the display interface 210 of FIG. 2 of first device 102 of FIG. 1.

The recap selection module 740 can present multiple instances of the custom recap 320 for selection by the user 214. For example, the recap selection module 740 can present the custom recap options 324, including the first recap option 324, the second recap option 326, and the third recap option 328.

It has been discovered that the display system 100 provides the custom recap 320 that is customized to the user 214. The media aggregator module 736 can use the source content descriptors 750 to extract portions of the source media 212 according to the preference of the user 214 to generate the custom recap 320 which provides the benefit of the custom recap 320 that is customized to the user 214.

It has also been discovered that the display system 100 provides enhancement of the custom recap 320. The recap enhancement module 738 can apply the recap enhancements 752 to the custom recap 320 for enhancing the custom recap 320.

The display system 100 can be implemented on the first device 102, on the second device 106, or partitioned between the first device 102 and the second device 106. The first software 626 of FIG. 6 of the first device 102 can include the display system 100. For example, the first software 626 can include the media collect module 730, the request process module 732, the media analysis module 734, the media aggregator module 736, the recap enhancement module 738, and the recap selection module 740. The first control unit 612 of FIG. 6 can execute the first software 626.

For example, the first control unit 612 can execute the media collect module 730, the request process module 732, the media analysis module 734, the media aggregator module 736, the recap enhancement module 738, and the recap selection module 740. As a specific example, the first control unit 612 can execute the media collect module 730 to receive, process, and store the source media 212 in the first storage unit 614.

As a further specific example, the first control unit 612 can execute the request process module 732 to receive the recap request 216 through the first user interface 618. To continue the example, the first control unit 612 can execute the media analysis module 734 to generate the source content descriptors 750 and the media aggregator module 736 to generate the custom recap 320. In furtherance of the example, the first control unit 612 can execute the recap enhancement module 738 to apply the recap enhancements 752 and the recap selection module 740 to display the custom recap 320 on the display interface 210 of first device 102.

In an example of the second device 106, the second software can include the display system 100. For example, the second software 642 can include the media collect module 730, the request process module 732, the media analysis module 734, the media aggregator module 736, the recap enhancement module 738, and the recap selection module 740. The second control unit 634 of FIG. 6 can execute the first software 626.

For example, the second control unit 634 can execute the media collect module 730, the request process module 732, the media analysis module 734, the media aggregator module 736, the recap enhancement module 738, and the recap selection module 740. As a specific example, the second control unit 634 can execute the media collect module 730 to receive, process, and store the source media 212 in the second storage unit 646.

As a further specific example, the second control unit 634 can execute the request process module 732 to receive the recap request 216 through the second user interface 338. To continue the example, the second control unit 634 can execute the media analysis module 734 to generate the source content descriptors 750 and the media aggregator module 736 to generate the custom recap 320. In furtherance of the example, the second control unit 634 can execute the recap enhancement module 738 to apply the recap enhancements 752. In conclusion of the example, the display system 100 can transmit the custom recap 320 through the communication path 104 to display the custom recap 320 on the display interface 210 of first device 102.

The display system 100 has been described with module functions or order as an example. The display system 100 can partition the modules differently or order the modules differently.

For example, the first software 626 can include the media collect module 730, the request process module 732, and the recap selection module 740 and the second software 642 can include the media analysis module 734, the media aggregator module 736, and the recap enhancement module 738. To continue the example, the first control unit 612 can execute the media collect module 730 to receive, process, and transmit the source media 212 through the communication path 104 to the second device 106 for storage in the second storage unit 346. In furtherance of the example, the second control unit 634 can execute the media analysis module 734 to generate the source content descriptors 750 and the media aggregator module 736 to generate the custom recap 320. In conclusion of the example, the display system 100 can transmit the custom recap 320 through the communication path 104 to display the custom recap 320 on the display interface 210 of first device 102.

The modules described in this application can be hardware implementation or hardware accelerators in the first control unit 616 of FIG. 6 or in the second control unit 638 of FIG. 6. The modules can also be hardware implementation or hardware accelerators within the first device 102 or the second device 106 but outside of the first control unit 616 or the second control unit 638, respectively.

The physical transformation from presenting the source media 212 on the display interface 210 results in the movement in the physical world, such as the user 214 making the recap request 216 with a physical gesture or audible command Movement in the physical world results in changes to the source media 212 by processing the source media 212 to generate the custom recap 320.

Figure 8:
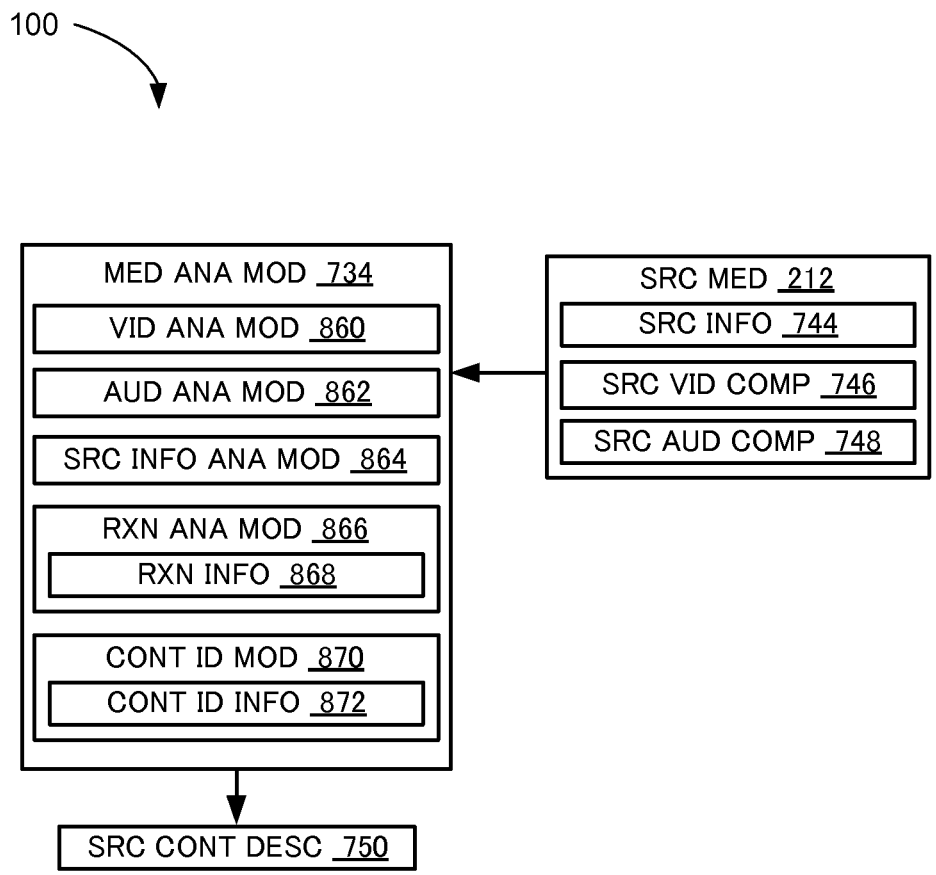
FIG. 8 is a view of the media analysis module of the display system.

Referring now to FIG. 8, therein is shown a view of the media analysis module 734 of the display system 100. The media analysis module 734 can generate the source content descriptors 750 with a video analysis module 860, an audio analysis module 862, a source information analysis module 864, a reaction analysis module 866, and a content identification module 870, or any combination thereof.

The media analysis module 734 can include the video analysis module 860, coupled to the media analysis module 734, configured to analyze the video portions of the media to generate descriptors of the media content. The video analysis module 860 can analyze the source video component 746 of the source media 212 to generate the source content descriptors 750. For example, the video analysis module 860 can analyze the motion vectors in the frames in the source video component 746 to generate the source content descriptors 750 that indicates specific events or occurrences, such as scene changes, changes in camera angle, the presence or appearance of characters, or the scene type currently being presented.

As a specific example, when the video analysis module 860 analysis of the motion vectors in a portion of the source video component 746 detects a high degree of motion, the media analysis module 734 can generate the source content descriptors 750 describing that portion of the source media 212 as an action scene type. In a further specific, the video analysis module 860 can implement facial recognition such that the media analysis module 734 can generate the source content descriptors 750 indicating the presence of specific actors, characters, or athletes.

The media analysis module 734 can include the audio analysis module 862, coupled to the video analysis module 860, for analyzing the audio portions of the media to generate descriptors of the media content. The audio analysis module 862 can analyze the source audio component 748 of the source media 212 to generate the source content descriptors 750. For example, the audio analysis module 862 can analyze the sounds, such as music, speech, or sound effects, in the source audio component 748 to generate the source content descriptors 750 indicating specific events or occurrences, such as a scene changes, the presence or appearance of characters, or the scene type currently being presented.

As a specific example, when the audio analysis module 862 detects laughter during a portion of the source audio component 748, the media analysis module 734 can generate the source content descriptors 750 describing that portion of the source media 212 as a comical scene. In a further specific example, when the audio analysis module 862 detects narration, the audio analysis module 862 can utilize speech recognition to generate the source content descriptors 750 describing what is occurring during that portion of the source media 212. In yet a further specific example, the audio analysis module 862 can implement voice recognition such that the media analysis module 734 can generate the source content descriptors 750 indicating the presence of specific actors, characters, or athletes.

The media analysis module 734 can include the source information analysis module 864, coupled to the audio analysis module 862, configured to analyze information from a provider of the media to generate descriptors of the media content. The source information analysis module 864 can analyze the source information 744 of the source media 212 to generate the source content descriptors 750. For example, the source information analysis module 864 can parse or analyze the source information 744 for general or specific information about the source media 212, such as show type, show title, episode number, or summary of the source media 212 such that the media analysis module 734 can generate the source content descriptors 750.

In another example, when the source information 744 includes captions or subtitles, the source information analysis module 864 can implement text recognition to parse the captions or subtitles such that the media analysis module 734 can generate the source content descriptors 750 describing what is occurring during that portion of the source media 212. As a specific example, when the source information analysis module 864 determines that the captions or subtitles in the source information 744 indicates audience laughter, the media analysis module 734 can generate the source content descriptors 750 describing that portion of the source media 212 as a comical scene.

The media analysis module 734 can include the reaction analysis module 866, coupled to the source information analysis module 864, configured to generate descriptors of the media content by analyzing the media content based on information describing viewer reaction to the media. The reaction analysis module 866 can analyze the source media 212 based on reaction information 868.

The reaction information 868 is information describing viewer reaction to the media content. For example, the reaction information 868 can be information describing the reaction of the user 214 to a portion of the source media 212 or other media similar to the source media 212 that the user 214 has viewed previously. As a further example, the reaction information 868 can be information describing the reaction of multiple viewers to a portion of the source media 212. The reaction information 868 can include descriptions, such as gestures or body language, such as smiling or clapping, or sounds, such as laughing, cheering, shouting, or crying.

The reaction analysis module 866 can generate the source content descriptors 750 based on correlation between the source media 212 and the reaction information 868. For example, the reaction analysis module 866 can generate the source content descriptors 750 for a portion the source media 212 as a comical or humorous scene when the reaction information 868 indicates that the user 214 or viewer responded to the portion of the source media 212 with laughter.

As a further example, the reaction analysis module 866 can increase the accuracy or certainty of the source content descriptors 750 when the reaction information 868 is based on the reaction of multiple viewers, which can include crowd sourced information. As a specific example, when the reaction information 868 indicates that 70% of viewers laughed or smiled in reaction to a portion of the source media 212, the reaction analysis module 866 generate the source content descriptors 750 of the particular portion of the source media 212 as a comical or humorous scene.

The media analysis module 734 can include the content identification module 870, coupled to the reaction analysis module 866, configured to generate descriptors of the media content by based on identification of specific aspects of the media content. The content identification module 870 can generate the source content descriptors 750 of the source media 212 with content identification information 870.

The content identification information 870 is information for describing specific aspects and content of the source media 212. For example, the content identification information 870 can be information about actors, characters, cast members, or athletes that appear in the source media 212. As another example, the content identification information 870 can be information about the plot or story line of the source media 212. In yet a further example, the content identification information 870 can be information about plays or strategies used by teams in a sporting event. The content identification information 870 can be received from sources other than the source media provider 742, such as an internal database stored in the first storage unit 614 of FIG. 6, the second storage unit 614 of FIG. 6, or a combination thereof, or an online databases or websites, such as IMDB, Stats.com, Wikipedia, or ESPN.

As an example, the content identification module 870 can generate the source content descriptors 750 of the source media 212 based on synchronization between the source media 212 and the content identification information 870. As specific example, when the content identification information 870 includes plot information, the content identification module 870 can correlate or synchronize the source media 212 to content identification information 870 to generate the source content descriptors 750 that indicate or describe when the important plot developments occur or when specific character or actors appear in the source media 212.

The media analysis module 734 can implement the above modules in any combination to generate the source content descriptors 750. For example, the video analysis module 860, the audio analysis module 862, the source information analysis module 864, the reaction analysis module 866, and content identification module 870 can have a plug-in architecture, which enables the media analysis module 734 to selectively implement the above modules for generating the source content descriptors 750.

As a further example, the media analysis module 734 can cross-reference or compare the analysis of each of the above modules to verify or confirm the source content descriptors 750. As a specific example, the media analysis module 734 can compare the source content descriptors 750 generated by the video analysis module 860 and the content identification module 870 to verify or confirm that a specific character, actor, or athlete is present during the portion of the source media 212. More specifically, when the source content descriptors 750 generated by the video analysis module 860 and the content identification module 870 both indicate a specific character, actor, or athlete is present, then the media analysis module 734 can verify or confirm the source content descriptors 750.

It has been discovered that the display system 100 increases accuracy when generating the source content descriptors 750 of the source media 212. The media analysis module 734 cross-check or synchronize the video analysis module 860, the audio analysis module 862, the source information analysis module 864, the reaction analysis module, the content identification module 870, or any combination thereof to accurately generate the source content descriptors 750.

Figure 9:
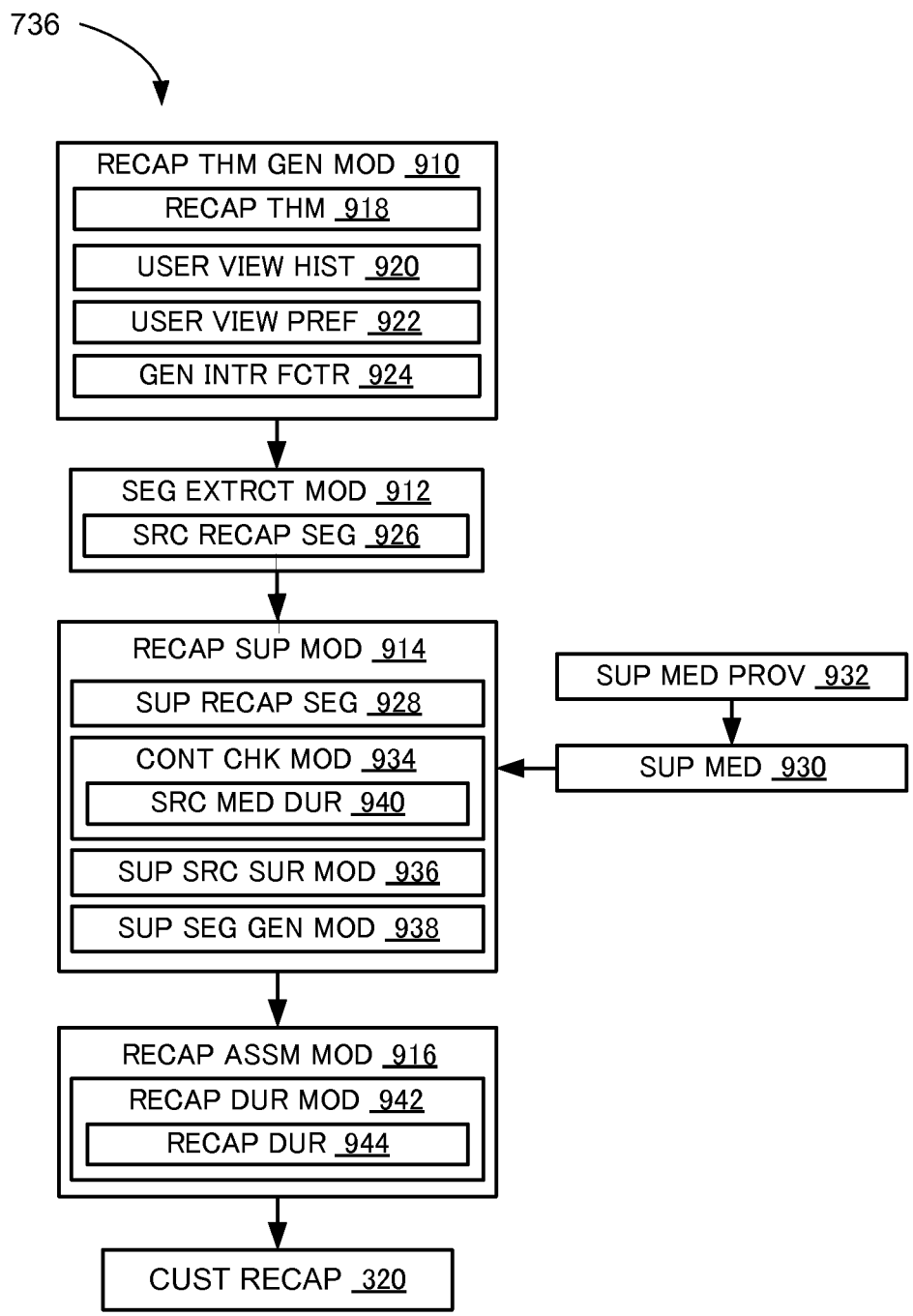
FIG. 9 is a view of the media aggregator module.

Referring now to FIG. 9, therein is shown a view of the media aggregator module 736. The media aggregator module 736 can generate the custom recap 320 with a theme generation module 910, a segment extraction module 912, a recap supplement module 914, and a recap assembly module 916.

The media aggregator module 736 can include the theme generation module 910 for generating the theme or focus of the recap. The theme generation module 910 can generate a recap theme 918 for the custom recap 320. The recap theme 918 is a focus or topic that the recap will cover. For example, the recap theme 918 can focus on specific or important plot developments or important events or occurrences in a sporting event. As a further example, the recap theme 918 can focus on specific aspects related to an actor, character, team, or player, based on the preferences of the user 214.

The theme generation module 910 can generate the recap theme 918 based on the source content descriptors 750, a user viewing history 920, a user viewing preference 922, general interest factors 924, or any combination thereof.

The user viewing history 920 is information about programs the user has viewed in the past. For example, the user viewing history 920 can include information about the viewing pattern or behavior of the user 214. As a specific example, the user viewing history 920 can include programs the user 214 has previously viewed. In another specific example, the user viewing history 920 can include episodes in a television series that the user has not yet viewed.

The user viewing preference 922 is information about content or specific aspects of content that the user prefers.

For example, the user viewing preference 922 can include information about the programs or genres, actors, characters, athletes, or teams the user 214 prefers to view. As a specific example, the user viewing preference 922 can include information about the viewing habits or viewing pattern of the user 214.

In another specific example, the user viewing preference 922 can include information about the intent or motivation of the user 214 when viewing the source media 212, such as the meaning of a certain reactions by the user 214 in response to portions the source media 212. For instance, the user viewing preference 922 can include information enabling the theme generation module 910 to focus on portions of the source media 212 that the user 214 response strongly to, such as when a foul or penalty is called by referees in a sporting event.

The user viewing preference 922 can be directly determined, such as through input by the user 214, or automatically determine, such as through analysis of the user viewing history 920 to determine which actors, programs, or players the user 214 has reacted positively or negatively to. As an example, the user viewing preference 922 can be indirectly determined or inferred based on the reaction information 868 of FIG. 8 for the user 214. As a specific example, the user viewing preference 922 can indicate preference for an actor, character, sports team, or athlete when the reaction information 868 indicates positive reaction, such as cheering or smiling, by the user 214 in response to an actor, character, sports team, or athlete.

The general interest factors 924 are themes that have broad or general appeal to viewers. For example, the general interest factors 924 can be basic or fundamental aspects of the source media 212, such as plot or story line development and flow or progress of a sporting event.

The theme generation module 910 can use the source information 744 as a basis for generating the recap theme 918. For example, the theme generation module 910 can determine the recap theme 918 based on the program type of the source media 212 as indicated by the source information 744.

As a specific example, when the source information 744 indicates that the source media 212 is a sporting event, the theme generation module 910 can generate the recap theme 918 focusing on sports elements, such as team highlights, team statistics, athlete statistics, and game analysis. In another specific example, when the source content descriptors 750 indicates that the source media 212 is a television drama or movie, the theme generation module 910 can generate the recap theme 918 focusing on story elements, such as story line, plot development, or character development.

The theme generation module 910 can use the user viewing preference 922 as a basis for generating the recap theme 918. For example, the theme generation module 910 can generate the recap theme 918 focusing on or featuring aspects or content in the source media 212 that the user 214 prefers, such as a favorite character, athlete, or team of the user 214.

The theme generation module 910 can use the user viewing history 920 as a basis for generating the recap theme 918. For example, theme generation module 910 can determine the span or amount of material needed to be covered or included in the recap theme 918 based on the user viewing history 920. As a specific example, when the user viewing history 920 indicates the user 214 has not viewed the previous three episodes of a program presented in the source media 212, the theme generation module 910 can set the span of the recap theme 918 to include material or content from the previous three episodes.

The theme generation module 910 can use the general interest factors 924 as a basis for generating the recap theme 918. For example, when the user viewing preference 922 or user viewing history 920 is unavailable, the theme generation module 910 can generate the recap theme 918 based on the general interest factors 924. As a specific example, the theme generation module 910 can generate the recap theme 918 focusing on basic plot development without a specific focus on a particular character. In another specific example, the theme generation module 910 can generate the recap theme 918 focusing on the progression of a sporting event without focusing on a specific team or athlete.

The theme generation module 910 can generate multiple instances of the recap theme 918 when the source media 212 contains material to support multiple instances of the recap theme 918. For example, the theme generation module 910 can generate a first one of the recap theme 918 focusing on a specific athlete on a sports team and another one of the recap theme 918 focusing on game statistics. As a further example, the multiple instances of the recap theme 918 can be used to generate the custom recap options 324 of FIG. 3, including the first recap option 324, the second recap option 326, and the third recap option 328, all of FIG. 3.

The recap theme 918 can be associated with the recap request 216. For example, the recap theme 918 can be associated with the recap request 216 when the user 214 makes the recap request 216 including an explicit request to focus on a specific aspect of the of the source media 212.

The media aggregator module 736 can include the segment extraction module 912, coupled to the theme generation module 910, configured to extract the portions of the media content relevant to or that correlate with the theme of the recap. The segment extraction module 912 can extract source recap segments 926 based on the recap theme 918.

The source recap segments 926 are a portion or segment of the original media containing content that is relevant to the theme of the recap. For example, the source recap segments 926 can be a portion or segment of the source media 212 that contains or includes content related to, consistent with, or that correlates with the recap theme 918.

The segment extraction module 912 can extract the source recap segments 926 from the source media 212 based on the recap theme 918. More specifically, the segment extraction module 912 can extract the source recap segments 926 based on correlation, correspondence, or relevance of the source content descriptors 750 to the recap theme 918 associated with the recap request 216. For example, when the recap theme 918 focuses on a specific aspect of the source media 212, such as a specific actor, character, team, or athlete, the segment extraction module 912 can search for the source content descriptors 750 that correspond with the specific aspect of the source media 212. In another example, when the recap theme 918 focuses on a scene type, such as humorous scenes, the segment extraction module 912 can search for the source content descriptors 750 that correlate with the humorous scenes.

The media aggregator module 736 can include the recap supplement module 914, coupled to the segment extraction module 912, configured to determine whether the relevant segments from the source content are sufficient to generate the recap, search for available supplemental sources of media for the recap, and generate supplemental material for the recap. The recap supplement module 914 can generate supplemental recap segments 928 from a supplemental media 930 with a content check module 934, a supplemental source search module 936, and a supplemental segment generation module 938.

The supplemental media 930 is media other than the original source content for supplementing the recap. The supplemental media 930 can be media other than the source media 212 for supplementing the custom recap 320 when the source recap segments 926 are insufficient to generate the custom recap 320. As an example, the supplemental media 930 can include media, such as text, images, video clips, sound clips, or any combination thereof.

The supplemental media 930 can be received from a source other than the source media provider 742. For example, the supplemental media 930 can be received from supplemental media providers 932, which are media providers other than the source media provider 742. The supplemental media providers 932 can be third party sources, such as websites, online databases, or subscription based services.

The recap supplement module 914 can include the content check module 934 for determining whether the source content is sufficient to generate the recap. The content check module 934 can determine whether the source media 212 is sufficient to generate the custom recap 320.

For example, the sufficiency of source media 212 can be determined based on the available number of the source recap segments 926. As a specific example, when too few or none of the source recap segments 926 correlating or matching the recap theme 918 are found in or extracted from the source media 212, the content check module 934 can determine that an insufficient amount of the source media 212 is available to generate the recap request 216.

In another example, the sufficiency of the source media 212 to generate the custom recap 320 can be determined based on a source media duration 940. The source media duration 940 is the duration or runtime of the source media 212. For example, the source media duration 940 can be the total available run time of the source media 212 to the point in time the recap request 216 was made. As a specific example, when the source media 212 includes 5 minutes of a program that includes 20 minutes of available content at the time the recap request 216 was made, the source media duration 940 can be 5 minutes.

The content check module 934 can, for example, compare the total run time of the source media 212, which can be determined from the source information 744, to the source media duration 940. To continue the example, when the source media duration 940 is less than the run time of the media to the point at which the recap request 216 was made, the content check module 934 can determine that an insufficient amount of the source media 212 is available to generate the recap request 216.

The recap supplement module 914 can include the supplemental source search module 936, coupled to the content check module 934, configured to search for available supplemental sources of media for the recap. The supplemental source search module 936 can search for the supplemental media 930 when the content check module 934 determines that an insufficient amount of the source media 212 is available to generate the custom recap 320.

For example, the supplemental source search module 936 can search for the supplemental media 930 by accessing the supplemental media providers 932, such as online sources, including ESPN, IMDB, or Wikipedia. In another example, the supplemental source search module 936 can search for the supplemental media 930 by checking the supplemental media providers 932 including subscription based services that the user 214 may have access to, such as Amazon Prime™, Netflix™, or premium sports channels, such as NBA League Pass™. In a further example, the supplemental media providers 932 can provide the supplemental media 930 as socially generated content, such as information about or related to the source media 212 from Twitter™ or Facebook™.

The recap supplement module 914 can include the supplemental segment generation module 938, coupled to the supplemental source search module 936, configured to generate supplemental material for the recap. The supplemental segment generation module 938 can generate supplemental recap segment 928 from the supplemental media 930 based on the recap theme 918.

The supplemental recap segments 928 are portions of media other than the original media content that correspond to the theme of the recap. The supplemental recap segments 928 can be portions or segments of the supplemental media 930 that contains or includes content related to, consistent with, or that correlates with the recap theme 918.

The supplemental segment generation module 938 can generate the supplemental recap segments 928, for example, by analyzing the supplemental media 930 for material or content that correlates, corresponds, or is relevant to the recap theme 918 when the content check module 934 determines that an insufficient amount of the source media 212 is available to generate the custom recap 320. As a specific example, the supplemental segment generation module 938 can generate the supplemental recap segments 928 with still images and text summarizing plot elements when the recap theme 918 is related to a plot summary for a movie or television show. In another specific example, the supplemental segment generation module 938 can generate the supplemental recap segments 928 with quotes, still images, or audio clips from an interview when the recap theme 918 is related to a sporting event.

The media aggregator module 736 can include the recap assembly module 916, coupled to the recap supplement module 914, configured to generate the recap with the available segments from the source and supplemental media. The recap assembly module 916 can generate the custom recap 320 with the source recap segments 926, the supplemental recap segments 928, or a combination thereof. For example, the recap assembly module can generate the custom recap 320 with supplemental recap segments 928 when the source recap segments 926 are insufficient to generate the custom recap 320.

The recap assembly module 916 can include a recap duration module 942 coupled to the media aggregator module 736. The recap duration module 942 is configured to determine the total length or duration of the recap. The recap duration module 942 can determine a recap duration 944 which is the total length or duration of the custom recap 320.

For example, the recap duration module 942 can determine the recap duration 944 based on the total number of the source recap segments 926 and the supplemental recap segments 928. As a specific example, the recap duration module 942 can set the recap duration 944 to include a maximum number of the source recap segments 926, the supplemental recap segments 928, or a combination thereof.

In another example, the recap duration module 942 can determine the recap duration 944 based on the content of the source recap segments 926, the supplemental recap segments 928, or a combination thereof. As a specific example, the recap duration module 942 can determine the recap duration 944 according a priority of the content of the source recap segments 926 and the supplemental recap segments 928. More specifically, when the total number of the source recap segments 926 and the supplemental recap segments 928 exceeds a threshold, the recap duration module 942 can determine the recap duration 944 based on duration of the source recap segments 926 and the supplemental recap segments 928 that are most relevant or have the highest correlation to the recap theme 918.

As a further example, the recap duration module 942 can determine the recap duration 944 based on the format of the source recap segments 926, the supplemental recap segments 928, or a combination thereof. As a specific example, when the source recap segments 926 or the supplemental recap segments 928 contain content that are text based, the recap duration module 942 can determine the recap duration 944 based on the time necessary for the user 214 to read the text, which can be determined by the scroll speed of the text on the screen or an indefinite duration until the user 214 closes or exits the custom recap 320.

It has been discovered that the display system 100 can be automatically determine preference of the user 214. The user viewing preference 922 can be inferred or indirectly determined with the reaction information 868, which provides the benefit of automatic determination of the preference of the user 214.

It has also been discovered that the display system 100 can intelligently determine the content of the custom recap 320. The display system 100 can extract the source recap segments 926 and the supplemental recap segments 928 that are relevant to or correlate with the recap theme 918 which provides the benefit of intelligently determining the content of the custom recap 320.

It has further been discovered that the display system 100 can supplement the custom recap 320. The display system 100 can search for and include the supplemental recap segments 928 with the source recap segments 926 when generating the custom recap 320 which provides the benefit of supplementing the custom recap 320.

Figure 10:
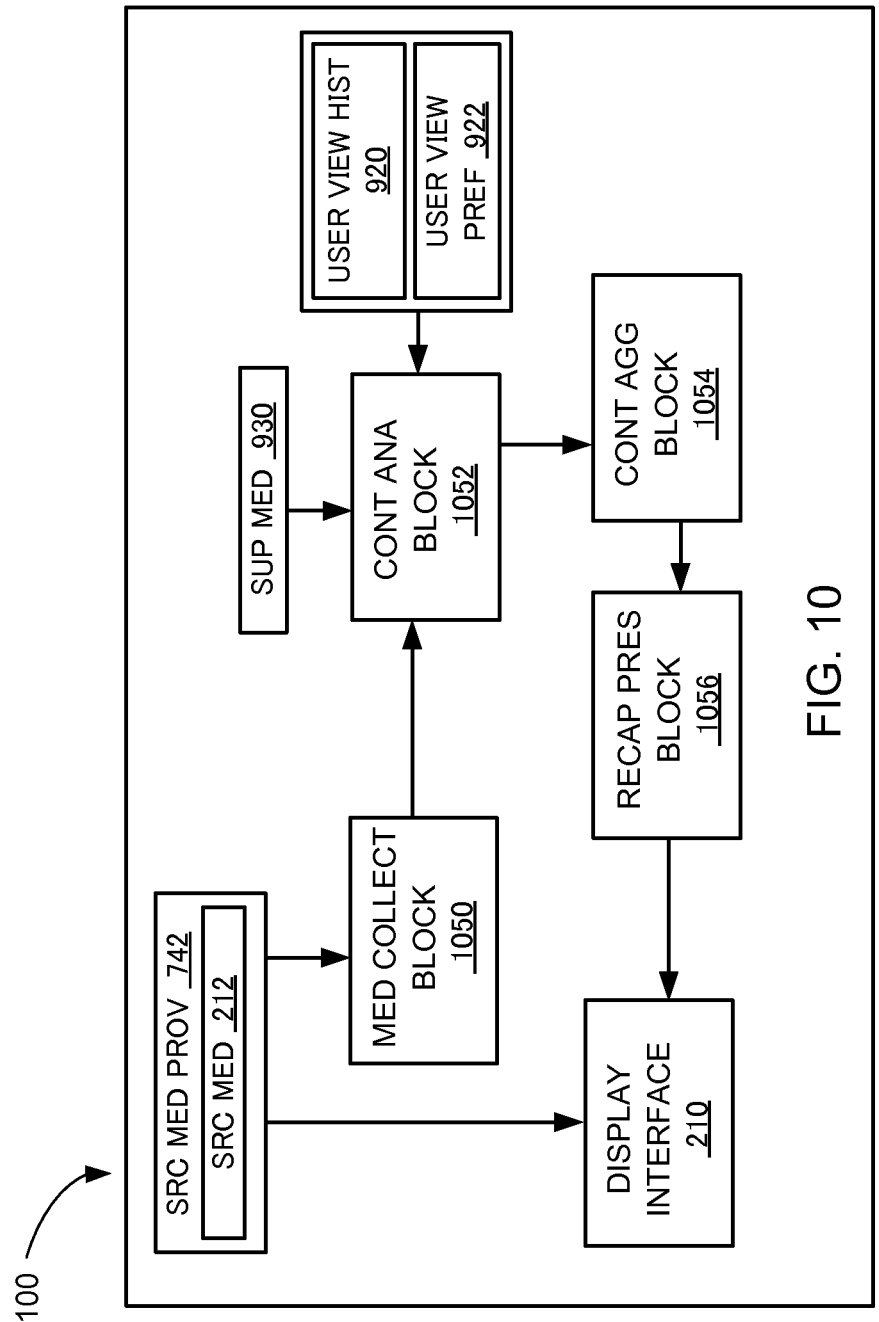
FIG. 10 is an example system diagram of the display system.

Referring now to FIG. 10, therein is shown an example system diagram of the display system 100. The display system 100 can include a media collection block 1050, a media analysis block 1052, a media aggregator block 1054, and a recap presentation block 1056.

The media collection block 1050 is configured to implement modules for receiving, processing, and storing for down-stream processing or modification. The media collection block 1050 can receive the source media 212 from the source media provider 742. The media collection block 1050 can implement media collect module 730 of FIG. 7 to format the source media 212 and the source information 744 of FIG. 7.

The media analysis block 1052, coupled to the media collection block 1050, is configured to implement modules for analyzing the content of the media and generating a description of the content of the media. The media analysis block 1052 can receive the source media 212 and the source information 744 from the media collection block 1050 and can receive the content identification information 870 of FIG. 8. The media analysis block 1052 can implement the media analysis module 734 of FIG. 7, including the video analysis module 860, the audio analysis module 862, the source information analysis module 864, the reaction analysis module 866, and the content identification module 870, all of FIG. 8, to generate the source content descriptors 750 of FIG. 7.

The media aggregator block 1054, coupled to the media analysis block 1052, is configured to implement modules for determining a theme or focus for the requested recap; extracting portions of the media that are relevant to the theme or focus based on the media descriptors; generating supplemental material for the recap; and generating the recap with the relevant source portions and supplemental material. The media aggregator block 1054 can receive the supplemental media 930 from the supplemental media providers 932, the user viewing history 920, and user viewing preference 922, all of FIG. 9. The media aggregator block 1054 can implement the theme generation module 910, the segment extraction module 912, the recap supplement module 914, and the recap assembly module 916, all of FIG. 9, to generate the custom recap 320.

The recap presentation block 1056, coupled to the media aggregator block 1054, is configured to implement modules for adding effects to enhance the recap and presenting the recap content for selection by the user. The recap presentation block 1056 can receive the custom recap 320 from the media aggregator block 1054. The recap presentation block 1056 can implement the recap enhancement module 738 the recap selection module 740, both of FIG. 7, to for displaying the custom recap 320 on the first device 102.

Figure 11:
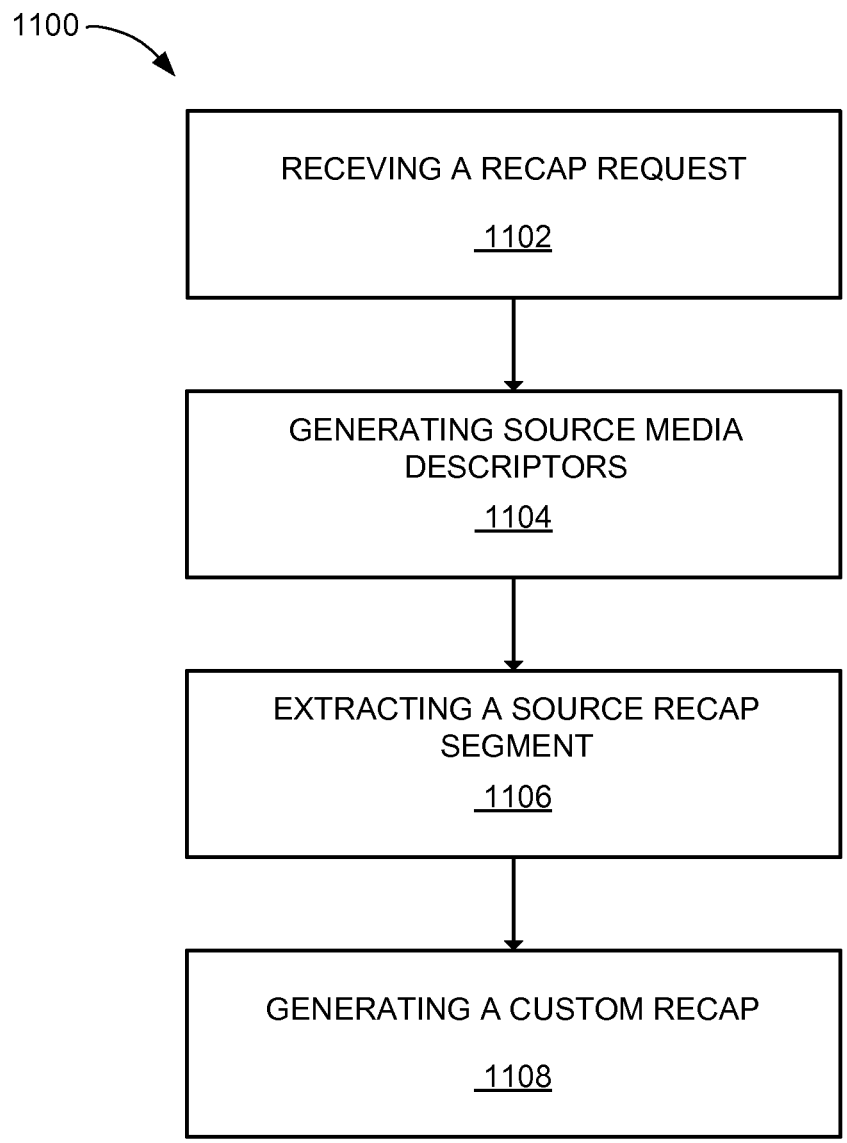
FIG. 11 is a flow chart of a method of operation of a display system in an embodiment of the present invention.

Referring now to FIG. 11, therein is shown a flow chart of a method 1100 of operation of a display system 100 in an embodiment of the present invention. The method 1100 includes: receiving a recap request for a source media in a block 1102; generating source media descriptors for the source media with a control unit in a block 1104; extracting a source recap segment from the source media based on correlation of the source media descriptors with a recap theme associated with the recap request in a block 1106; and generating a custom recap with the source recap segment for displaying on a device in a block 1108.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a display system comprising:
 receiving a recap request for a source media representing a live content;
 generating source content descriptors for the source media with a control unit including a processor;
 extracting a source recap segment from the source media based on a correlation of the source content descriptors with a recap theme associated with the recap request; and generating a custom recap with a content from the source recap segment, wherein the custom recap includes a portion of the source media temporally preceding the source media currently being presented for displaying the custom recap along with the source media on a device.

2. The method as claimed in claim 1 wherein generating the source content descriptors includes generating the source content descriptors based on correlation between the source media and a reaction information.

3. The method as claimed in claim 1 further comprising generating the recap theme based on a user viewing preference.

4. The method as claimed in claim 1 further comprising generating the recap theme based on a user viewing history.

5. The method as claimed in claim 1 wherein generating the custom recap includes generating the custom recap with a supplemental recap segment when the source recap segment is insufficient to generate the custom recap.

6. A method of operation of a display system comprising:
receiving a source media representing a live content;
generating source content descriptors for the source media with a control unit including a processor;
extracting a source recap segment from the source media based on correlation of the source content descriptors with a recap theme associated with the recap request; and
generating a custom recap with a content from the source recap segment, wherein the custom recap includes a portion of the source media temporally preceding the source media currently being presented for displaying the custom recap along with the source media on a device.

7. The method as claimed in claim 6 wherein generating the source content descriptors includes generating the source content descriptors with content identification information.

8. The method as claimed in claim 6 wherein generating the source content descriptors includes analyzing a source information of the source media to generate the source content descriptors.

9. The method as claimed in claim 6 further comprising applying a recap enhancement to the custom recap.

10. The method as claimed in claim 6 further comprising generating a supplemental recap segment, for supplementing the custom recap, with a supplemental media.

11. The method as claimed in claim 6 further comprising generating the recap theme based on a general interest factor.

12. A display system comprising:
a control unit including a processor configured to:
receive a recap request for a source media representing a live content;
extract a source recap segment from the source media based on correlation of the source content descriptors with a recap theme associated with the recap request;
generate a custom recap with a content from the source recap segment, wherein the custom recap includes a portion of the source media temporally preceding the source media currently being presented; and
a display interface, coupled to the control unit, configured to display the custom recap along with the source media on a device.

13. The system as claimed in claim 12 wherein the control unit is configured to generate the source content descriptors based on correlation between the source media and a reaction information.

14. The system as claimed in claim 12 wherein the control unit is configured to generate the recap theme based on a user viewing preference.

15. The as claimed in claim 12 wherein the control unit is configured to generate the recap theme based on a user viewing history.

16. The system as claimed in claim 12 wherein the control unit is configured to generate the custom recap with a supplemental recap segment when the source recap segment is insufficient to generate the custom recap.

17. The system as claimed in claim 12 wherein the control unit is configured to receive the source media for receiving the live content from a source media provider.

18. The system as claimed in claim 17 wherein the control unit is configured to generate the source content descriptors with content identification information.

19. The system as claimed in claim 17 wherein the control unit is configured to analyze a source information of the source media to generate the source content descriptors.

20. The system as claimed in claim 17 wherein the control unit is configured to apply a recap enhancement to the custom recap.

21. The system as claimed in claim 17 wherein the control unit is configured to generate a supplemental recap segment, from a supplemental media, for supplementing the custom recap.

22. The system as claimed in claim 17 wherein the control unit is configured to generate the recap theme based on a general interest factor.

* * * * *